United States Patent [19]

Nakayama

[11] Patent Number: 5,526,443
[45] Date of Patent: Jun. 11, 1996

[54] METHOD AND APPARATUS FOR HIGHLIGHTING AND CATEGORIZING DOCUMENTS USING CODED WORD TOKENS

[75] Inventor: Takehiro Nakayama, Sunnyvale, Calif.

[73] Assignees: Xerox Corporation, Stamford, Conn.; Fuji Xerox Co., Ltd., Tokyo, Japan

[21] Appl. No.: 556,436

[22] Filed: Nov. 9, 1995

Related U.S. Application Data

[63] Continuation of Ser. No. 319,037, Oct. 6, 1994, abandoned.

[51] Int. Cl.$^6$ ........................................ G06K 9/72
[52] U.S. Cl. .................. 382/229; 382/224; 382/173; 395/600; 364/419.08
[58] Field of Search ........................ 382/229, 224, 382/173; 395/600; 364/419.08

[56] References Cited

U.S. PATENT DOCUMENTS 4,907,283  3/1990  Tanaka et al. .................... 382/229
5,375,176  12/1994  Spitz .................................. 382/39
5,384,863  1/1995  Huttenlocher et al. ............. 382/9

OTHER PUBLICATIONS

Cavnar, William & Trenkle, John, "N–Gram–Based Text Categorization," Environmental Research Institute of Michigan, pp. 161–175, 1994.

*Primary Examiner*—Jose L. Couso
*Assistant Examiner*—Anh H. Do
*Attorney, Agent, or Firm*—Oliff & Berridge

[57] ABSTRACT

Highlighting and categorization of documents is carried out by using word tokens which represent words appearing in a document. Elimination of certain unimportant word tokens is first completed, after which the remaining words of the document are ranked according to their word token appearance rates. These rates are then used to highlight frequently appearing words in the document which indicate the document's topic. The document can also be categorized using document profiles developed from the word tokens.

50 Claims, 8 Drawing Sheets

AxxAgxix xA xxxgxxx gixAAx Axxixixg AxAx Axx x
Axxgxxgx xAxxxiAixx AxxigxxA Ax xxAiAg AAx xgxAixA
xxAxAixxxAigx xA AAx xxxxxxAxA xxxgxxxxAx xAixA
xxxgxxx AAx AxAAxx Axxxx. Aixxxx Aixxxx AixxxixixxxA
xxxAgxix gxxxiAxx xAxxxiAixxAixx xxiAxxix xx xAixA
AAx AxxA AxAx xxx xxxAxxAxA.
FIG.4

| CHARACTER SHAPE CODE | MEMBERS |
|---|---|
| A | ABCDEFGHIJKLMNOPQRSTUVWXYZbdfhklt β 1234567890#$&()/<>[]@{}\| |
| x | acemnorsuvwxz |
| ì | iìîâéêëïõùû |
| g | gpqyç |
| j | j |
| ˋ | ˋ |
| ∫ | ∫ |
| ˙ | ˙ |
| ·· | ·· |
| = | = |
| U | äëöüÖÜ |
| ¸ | ¸ |

Function words (frequency > 0.005)

the of and a to in you that it he for on as with his they at this from I or by one but what all when we there can an your which their if will each about up out them she many some so these would other into her like him could no than its who now my over down only may after where most through before our me any same around another must because such off every between should under us along while might next below something both few those

FIG. 7

Stop token list derived from Fig.6

AAx xA xxA x Ax ix gxx AAxA iA Axx xx xiAA Aix AAxg AAix Axxx A Ag xxx AxA xAxA xAA xAxx AAxxx gxxx xAixA AAxix xxxA xAxxA xg AAxx xAx xxxg xxxx xxxAA xAAxx ixAx AiAx iAx xxAg xxg xAxxx AAxxxgA AxAxxx xxxxxA xxxAAxx Axxxxxx xxxxg AxAxxxx xAxxAA xxAxx xAxxg xAiAx xigAA AxAxx xxxxAAixg AxAA

FIG.7

According to national accounts data, construction activity expanded overall by 5.1% in real terms during the first three-quarters of 1988. The increase in building output, excluding interior construction, amounted to a strong 14% in value terms, equivalent to a real increase of 9% allowing for the 5% rise in construction costs. The high growth rate was traced in part to mild weather during the first quarter of 1988. Major reasons for the construction boom were the relatively low interest rates on building credit coupled with falling mortgage rates in the first half of 1988. By the end of September 1988, the building sector's labor force had grown to 175,847 persons, a gain of 4.9% over one year earlier. There were 6% more Swiss compared to 4% more foreigners employed. Capacity expanded strongly due to the 21% increase in equipment, machinery and building material investment. A survey conducted by the Swiss Builders Association shows that the number of incoming orders in the civil engineering sector expanded by 27% to Fr.4.8 billion in the first nine months of 1988. Since production rose only 11% during the same period, the work backlog grew by 26%. Among the work to be executed are some large contracts recently awarded requiring several years for completion (e.g. national highway tun-

METHOD AND APPARATUS FOR HIGHLIGHTING AND CATEGORIZING DOCUMENTS USING CODED WORD TOKENS

This is a Continuation of application Ser. No. 08/319,037 filed Oct. 6, 1994, now abandoned.

BACKGROUND OF THE INVENTION

1. Field of the Invention

The present invention relates to a method and apparatus for highlighting and categorizing documents and, more particularly, to an automatic method for highlighting words of a document relating to a specific topic of the document using word tokens and for categorizing the document into a pre-existing topical category.

2. Description of Related Art

Techniques for converting scanned image data into text data suitable for use in a digital computer are well known.

However, it has heretofore not been possible to use such techniques or systems to automatically highlight or otherwise "mark up" key words or phrases of a document. Nor has it been possible to automatically categorize a document into specific topic categories. Rather, as each document is provided to the system, some key words corresponding to specific topics of the document must be provided to the system. This has been accomplished by having the operator input data concerning key words of the document to the system.

SUMMARY OF THE INVENTION

This invention therefore provides for an apparatus and method for highlighting and categorizing a document.

This invention also provides for an apparatus and method which allows a reader to easily identify the topic of a document by highlighting specific words in the document.

This invention further provides for stop token lists used to remove word tokens corresponding to common function and numerical words.

This invention provides an apparatus and method for automatically categorizing documents by comparing "distances" between a word shape token and stored training or reference data.

According to one embodiment of the apparatus and method, a sequence of word tokens, each comprising a number of different character shape codes or abstract coded character classes, are derived from an image of a document. Certain character shape codes are then eliminated or removed from the sequence of word tokens. The removed character shape codes are those that are not associated with important linguistic information. The resulting sequence of word shape tokens is then analyzed using a statistically based stop token list. This analysis allows for the further removal of tokens that are derived from "common function" words using a conventional pattern-matching technique.

The reduced sequence of word tokens is then analyzed to obtain the frequency of appearance or frequency appearance rates of each word token. These rates are then ranked from the most frequently appearing to the nth most frequently appearing rate. These rates can then be used to highlight or mark-up a document. As used here, the word "highlight" refers to a plurality of possible ways to mark-up a document which allows a reader to quickly tell the topic, subject etc. ... of the document. Certain key words relating to the topic of the document will have corresponding high frequency of appearance rates.

Another embodiment of this invention allows for the further elimination of certain numerical words using an optional token list.

Still another embodiment of this invention allows the reduced sequence of word tokens to be further used to develop document or token profiles which are used to automatically categorize the document or report.

BRIEF DESCRIPTION OF THE DRAWINGS

The invention is described in relation to the accompanying drawings, in which:

FIG. 4 shows the text of FIG. 3 converted to a sequence of word tokens using abstract coded character classes;

FIG. 5 shows the abstract coded character classes or character shape codes used to derive word tokens which correspond to classes of actual script characters;

FIG. 6 shows a list of common function words having a statistical frequency of occurrence greater than 0.0005;

FIG. 7 shows the associated stop token list of word tokens corresponding to the common function words of FIG. 6;

FIG. 8 is an example of a document highlighted or marked up according to one embodiment of the present invention;

DETAILED DESCRIPTION OF THE PREFERRED EMBODIMENT

Figure 1:
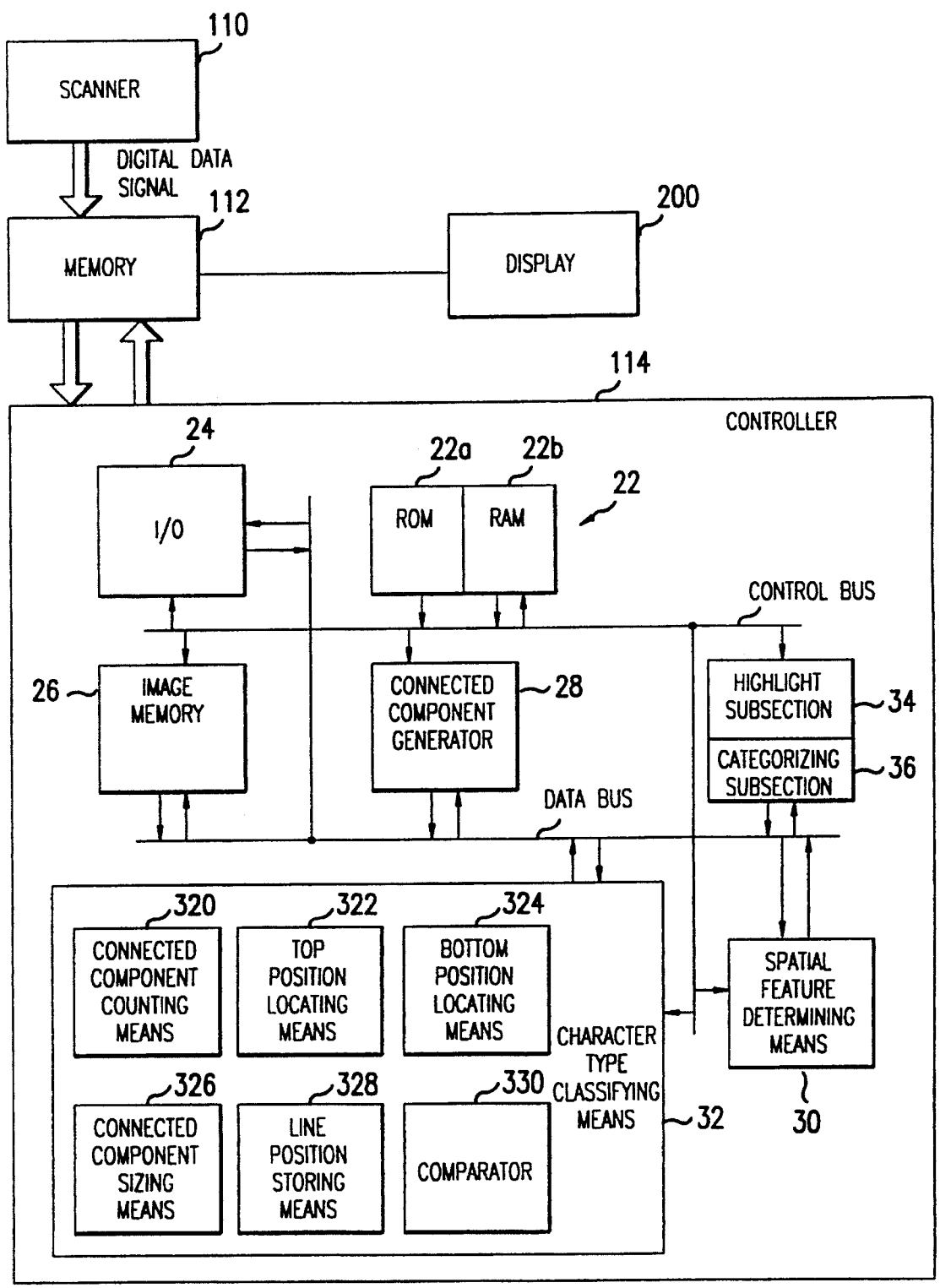
FIG. 1 shows a block diagram of a scanning apparatus.
Figure 3:
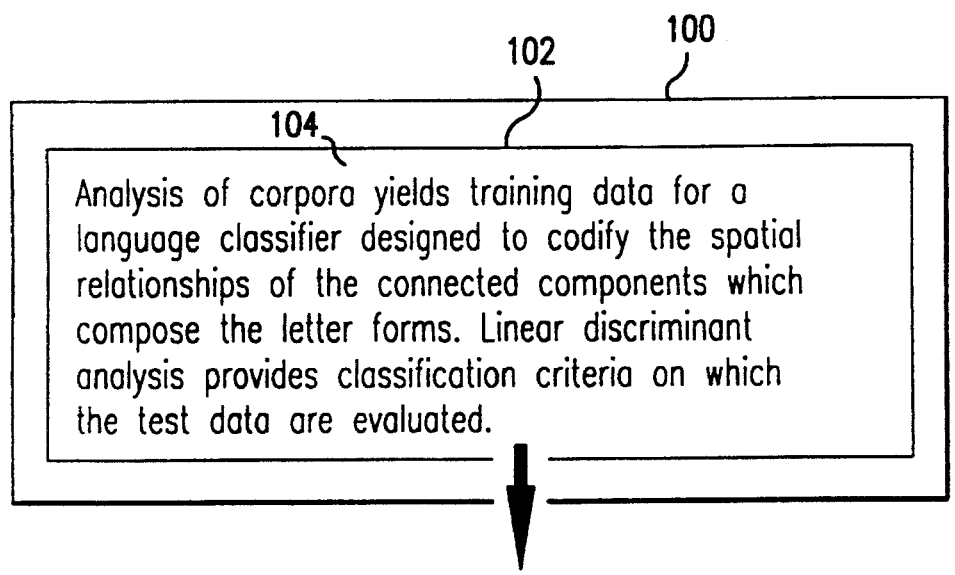
FIG. 3 shows an actual text portion of a document.

As shown in FIG. 1, a scanning system similar, but not identical, to the system disclosed in more detail in copending U.S. patent application Ser. Nos. 08/047,514 and 08/047,540, both filed Apr. 19, 1993 and incorporated by reference herein, comprises a scanner 110 having a charge-coupled device (CCD) or the like. The scanner 110 scans a document 100, such as the one shown in FIG. 3, having an image 102 which comprises a script-type text string, and outputs a digital data signal representative of the location and image density of a plurality of pixels comprising the image 102 of the original document 100. This digital data signal is sent to a memory 112, where it is stored temporarily or indefinitely. The digital data signal, when output from the memory 112, is input to a general purpose digital computer 114. Once input to the general purpose computer 114, the digital data signal is first cleaned up by removing any non-text portions of the image 102, leaving a text portion 104. Further, any scanner artifacts of the digital data signal, such as skew or the like, are corrected for. The cleaned up digital data signal is then restored to the memory 112 or stored in a memory of the general purpose computer 114. Alternatively, the scanner can provide some of the preprocessing, such as removal of scanner artifacts.

As shown in FIG. 1, the general purpose digital computer 114 of this invention comprises a memory 22 for storing a control program, an input/output circuit 24 for inputting the digital data signal from the memory 112 and for outputting signals representative of certain word tokens of the text portion 104 as well as other signals relating to highlighting or categorization. The general purpose computer 114 also comprises an image memory 26 for storing the digital data signal, a connected component generating means 28 for generating connected components from the digital data signal, spatial feature determining means 30 for determining the coordinates of lines, words and character cells of the text portion 104 and the location for each connected component within each character cell, character-type classifying means 32 for converting the character cell to an abstracted character code class, a highlighting subsection 34 and a categorizing subsection 36. The memory 22 for storing the control program may comprise either a ROM 22a or a RAM 22b.

The classification means 32 may include a connected component counting means 320 for determining the number of connected components within the current character cell, a top position locating means 322 for locating the top position of at least one connected component within the current character cell, a bottom position locating means 324 for locating the bottom position of at least one connected component of the current character cell, a connected component sizing means 326 for determining the height and width of at least one connected component of the current character cell, a line position storing means 328 for storing at least one of the baseline and x-line positions of the line corresponding to the current character cell and comparing means 330 for comparing at least one of a connected component top position, a connected component bottom position, and a connected component height with at least one of a baseline position, a x-line position and a connected component width. Of course, it is understood that each function and corresponding means of the connected component generating means 28, the spatial feature determining means 30, and the classification means 32 can be implemented by independent means, and such structure would be equivalent to the preferred embodiments of the present invention as set forth above. It should also be appreciated that these means implemented on the general purpose computer can alternately be implemented using a special purpose computer or a corresponding hardwired discrete element circuit or integrated circuit.

The connected component generating means 28, the spatial feature determining means 30, and the character-type classifying means work together to convert the text portion 104 of the document image 102 into a sequence of word tokens, as set forth in U.S. patent application Ser. No. 08/047,540. Each word token comprises at least one (and usually more) abstract coded character classes as shown in FIG. 4. Each abstract coded character class represents a class of characters in script-type. For European type scripts, such as those used in English, French and German, the abstract coded characters and the script characters they represent are shown in FIG. 5. It should further be appreciated that the general purpose computer 114 could comprise only the memory 22, the input/output circuit 24, the image memory 26, the highlighting subsection 34 and the categorizing subsection 36, when the text portion 104 of the document image 102 has already been converted into word tokens.

Figure 2:
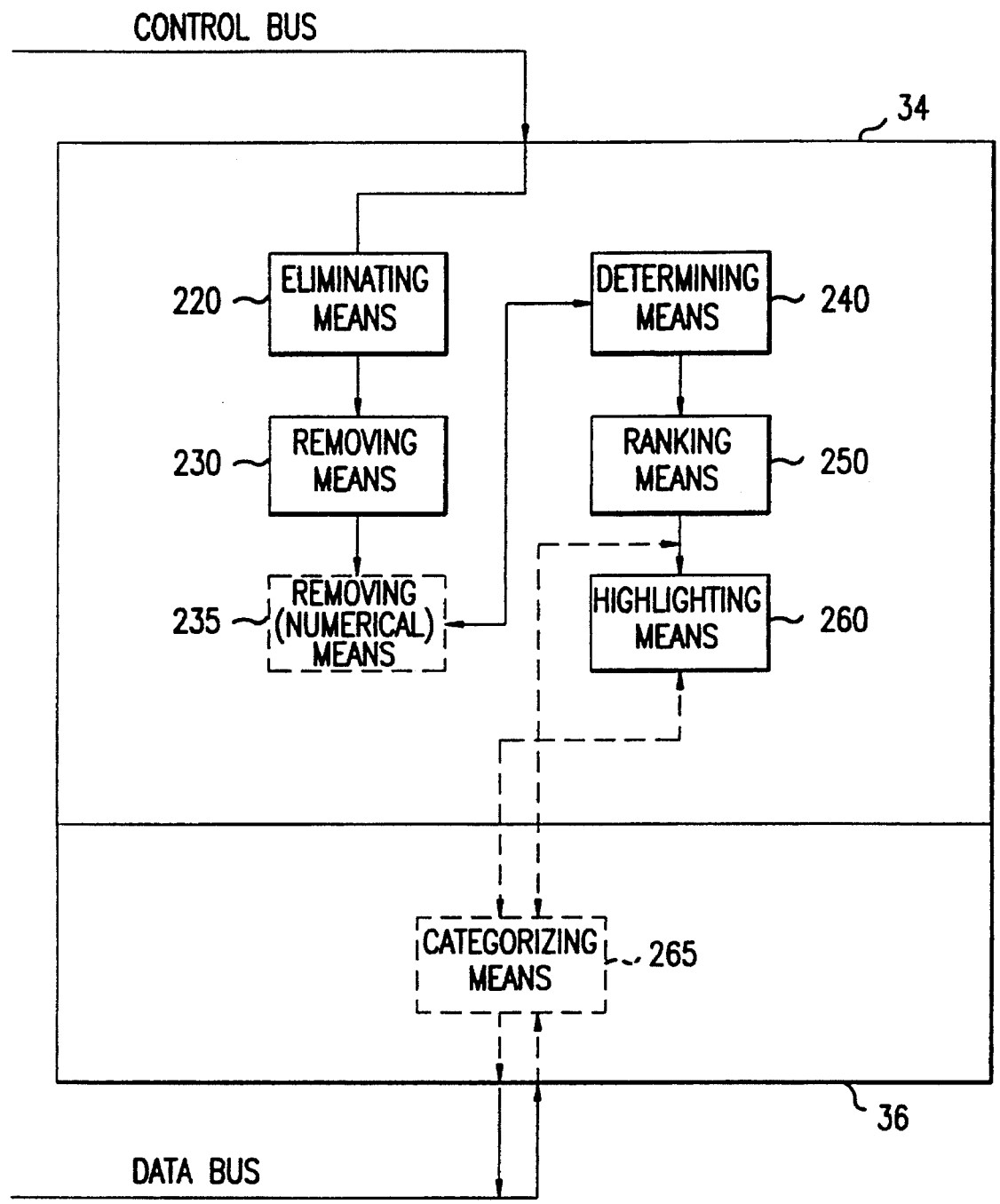
FIG. 2 shows details of highlighting and categorizing subsections.

As shown in FIG. 2, a highlighting subsection 34 comprises eliminating means 220 for eliminating certain character shape codes or abstract coded character classes from the sequence of word tokens, means for removing certain common function word tokens 230 from the sequence of word tokens using a stop token list similar to the one shown in FIG. 7 to form a reduced sequence of word tokens. The highlighting subsection 34 also comprises means for determining word token frequency appearance rates 240, ranking means 250 for ranking the frequency of appearance rates derived from the most frequently appearing word tokens of the reduced sequence and highlighting means 260 for highlighting, underlining or otherwise marking up words of a document corresponding to the word tokens having an "nth" highest frequency of appearing rate or higher. The categorizing subsection 36 contains categorizing means 265 which categorizes a document into pre-existing categories. The ranking means 250 also includes means for determining the nth or more most frequently appearing word tokens based on the ranked frequency of appearance rates.

In operation, the document 100 containing the image 102 is placed into and scanned by the scanner 110 to generate a serial or parallel digital data signal. The digital data signal comprises a plurality of signal portions, each portion representative of a corresponding pixel of the original image 102. Each pixel of the image 102 has a location in the image 102 and an image density. Accordingly, each signal portion of the digital data signal includes data representative of the location and image density of the corresponding pixel.

The digital data signal output by the scanner 110 is then stored in memory 112. The memory 112 may comprise a RAM, a flash memory, a disk memory or the like. Regardless of the type of memory 112, the digital data signal is stored in the memory 112 in response to the location and image density data within each signal portion. Of course, it is understood that the digital data signal can be directly input to the general purpose digital computer 114, rather than into the intermediate memory 112. Alternately, the memory 112 can be incorporated into the general purpose digital computer 114. In any case, it is understood that the memory 112 is used to provide long-term storage of the image 102.

Once the operator has completed inputting documents into the scanner 110 or the system otherwise determines that the digital data signal representative of the image 102 should be converted to text data, the digital data signal representative of the image 102 is output from the memory 112 to the general purpose computer 114.

The digital image data signal stored in the memory 112 is output to the general purpose computer 114, where it is input through the input/output means 24 to an image memory 26. The gross script-type of the text portion 104 is assumed to be a European script-type. Of course, it is understood that if the gross-script type of the text portion 104 is not known to be a European script-type, the present invention can be combined with the method and apparatus for determining the gross script-type described in U.S. application Ser. No. 08/047,515, incorporated herein by reference.

Once the digital data signal has been completely stored in the image memory 26, the digital data signal is then made available to the connected component generating means 28. The connected component generating means 28 divides the digital data signal representative of the image 102 into a plurality of connected components, each connected component comprising one or more signal portions. Each connected component comprises signal portions corresponding to those pixels of the original image 102 which have a certain minimum image density and form a continuous path. Each script character generally corresponds to one connected component, as in the "F" of "Fuji" or more than one connected component, as in the "j" or "i" in "Fuji".

Once the connected component generating means 28 generates the plurality of connected components for the image 102 from the digital data signal, the digital data signal corresponding to the image 102 and the list of connected components generated by the connected component generating means 28 is stored to the image memory 26 and output to the spatial feature determining means 30.

The spatial feature determining means 30 determines the spatial features of the text portion, such as line positions, word spacing, and character cells. Each character cell includes the vertically aligned connected components within a line between adjacent spaces. For example, the characters "i" and "j" of "Fuji" are each two independent connected components. The spatial feature determining means 30 groups all vertically aligned connected components of one line into one character cell. One method and apparatus for determining spatial features of the text portion 104 from a list of connected components of the text portion 104 is described in U.S. application Ser. No. 08/047,514.

The list of connected components and character cells is then output by the spatial feature determining means 30 to a character-type classifying means 32. The character-type classifying means 32 converts the connected component or components within a character cell to one of a plurality of abstract character code classes based on the number and locations of the connected components classes within a character cell. The preferred list of abstract coded character classes and the script-type characters corresponding to each abstract coded character class, are shown in FIG. 5. As shown in FIG. 5, different abstract character code classes are used. Each abstract character code class represents one or more characters, based on the number of independent connected components in the character cell, the relative locations between the independent connected components of each character cell, and the location of the connected components within the character cell.

A simplified flowchart of the operation of the script determining system set forth above is disclosed in U.S. application Ser. No. 08/047,540.

Because the method and apparatus of the present invention are statistically based, they are very robust and can withstand even a very poorly printed and/or scanned document. That is, it is not necessary for the digital data signal or the connected components generated from the digital data signal to perfectly represent every character of the document. Rather, the present invention is able to withstand such common scanning errors such as splitting a single connected component into two or more connected components, merging two or more separately connected components into a single connected component or misplacing the connected components on the line.

In sum, the system generates a sequence of word tokens comprising one or more abstract coded character classes. These are provided to the highlighting subsection 34 and the categorizing subsection 36, which respectively highlight and categorize the document. The operation of these two sections will now be explained.

Figure 9:
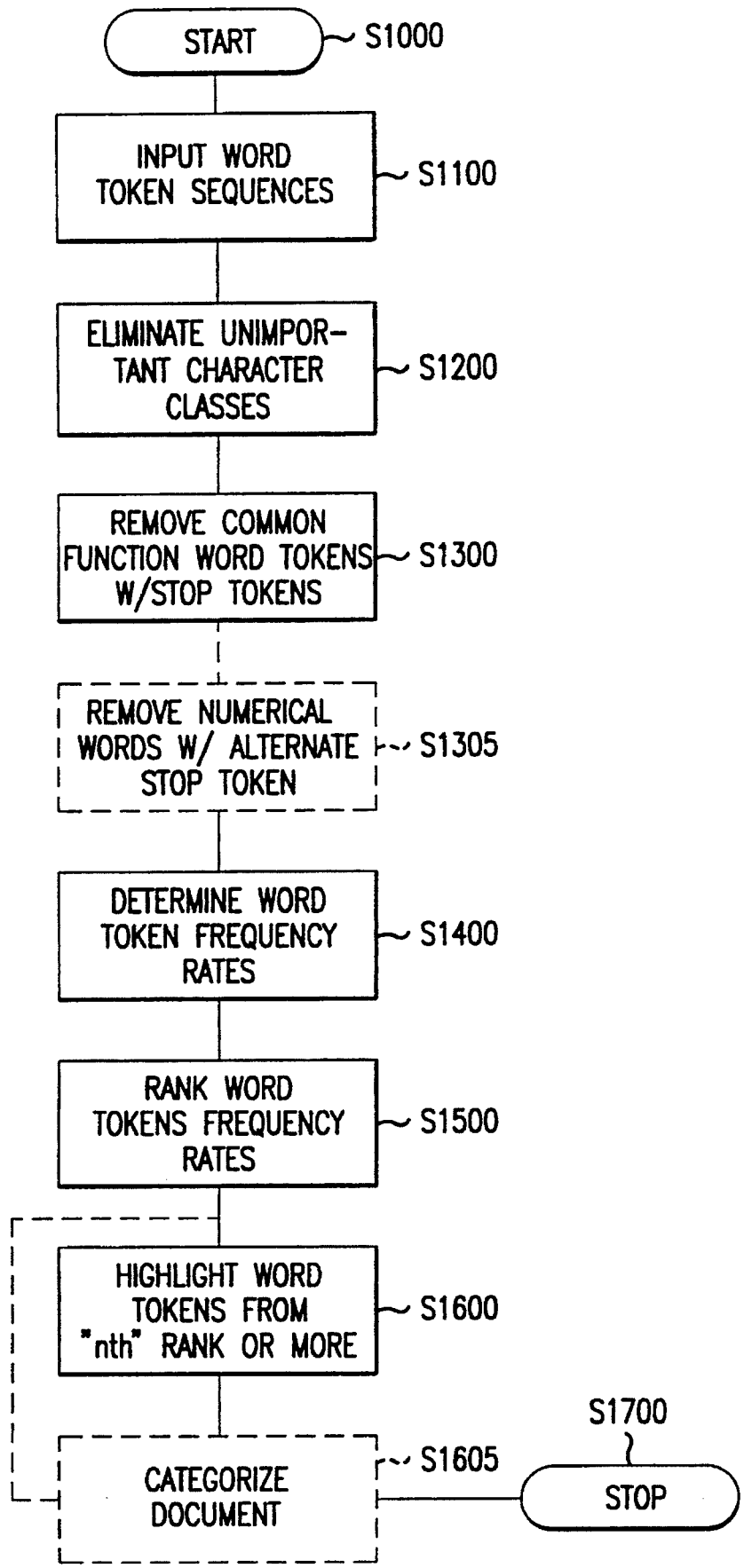
FIG. 9 is a flowchart corresponding to embodiments of the present invention.

Referring to FIG. 9, which is a flowchart of one embodiment of this invention, word token sequences are input at step S1100 into the eliminating means 220 where they are processed at step S1200 to eliminate certain unimportant abstract coded character classes or character shape codes such as ".", "!", "-", ",", and ":", among others, which typically contain less important linguistic information, from the word token sequences.

Once these shape codes are eliminated, the sequence of word tokens is sent to removing means 230 to remove certain predetermined "common function" words at step S1300, such as those shown in FIG. 6 using a corresponding stop token list, as shown in FIG. 7, and a pattern matching technique. In general "common function" words are those that make up the set of prepositions, determiners, conjunctions, pronouns and modals, and are distinguished from "content words", such as nouns, verbs and adjectives. Words that overlap both types of words are considered to be function words and are treated as such.

The common function words shown in FIG. 6 have frequency appearance rates of more than 0.0005 based on statistical data. The resulting stop token list shown in FIG. 7 is derived from these function words, where any repetitive word token has been removed. In this manner the word tokens remaining in the sequence of word tokens in FIG. 4 initially generated from the text portion 104 are compared to the stop token list by the removing means 230, which removes the word tokens also appearing in the stop token list to form a reduced list of word tokens comprising only "content words".

At this point, the reduced sequence of word tokens may be sent to the determining means 240 to determine, at step S1400, the word token frequency appearance rates for each different word token that appears in the reduced sequence. In another embodiment of this invention, the sequence of word tokens is first sent to an optional removing means 235 at step S1305 to remove any numerical words using an alternate or optional form of the stop token list in FIG. 4. This optional stop token list includes the sequence A* (where *=A, AA, AAA, AAAA, etc.) to the list.

In either case, a new reduced sequence of word tokens is sent to the determining means 240, which determines the corresponding frequency of appearance rates. Once the frequency of appearance rates have been determined, they are thereafter ranked at step S1500 using the ranking means 250. The ranking means 250 ranks each word token and determines the most frequently appearing word token to an nth most frequently appearing word token (where n is a whole number).

In an embodiment of the present invention, the words of the text portion 104 corresponding to these ranked word tokens are then highlighted, underlined or otherwise marked up at step S1600, as shown in FIG. 8. This marked-up version of the text portion 104 is displayed on a display 200, which can be any one of a variety of displays such as a CRT, hard copy printout or LCD display, etc.

These words are highlighted from an "nth" word or more, where n represents a ranking such as 10. In such a case each word which has a ranking of 10, 9, 8, 7 etc. . . . will be highlighted, i.e., 10th most frequently appearing word, 9th most frequently appearing word, etc.

For example, as shown in FIG. 8, an economic report concerning the construction industry may contain the word "construction" a number of times. The word "construction" can be represented as a word token. The present invention calculates the appearance rate for the word token associated with the word "construction", and ranks its appearance rate versus the appearance rates of all other words remaining in the reduced sequence of word tokens generated from the report, e.g., the word "construction" is the 10th most frequently used word in the report. This invention then highlights or underlines the words corresponding to this word token or otherwise marks up this report to allow a reader to easily spot where the word construction was located throughout the report. Similarly, all words in the report corresponding to the word tokens that occur as often as the word construction, i.e. the 10th most frequent token appearance rate or more, e.g., the 9th, 8th, 7th . . . appearance rates can be similarly highlighted, underlined or otherwise marked up to allow a reader to easily identify them as well.

Another embodiment of this invention includes an additional categorizing step S1605 which uses word tokens to categorize the document shown in FIG. 8. The word tokens are used to develop a specific document profile. Using reliable reference data and statistical analysis, reference profiles can also be computed to categorize a number of reference documents into a number of pre-existing categories using a form of the categorizing means 265. The specific document profile is then compared to at least one reference profile to determine its category.

The categorizing step S1605 may be used in addition to the highlighting step S1600 or may be separate from the highlighting step S1600, i.e., the categorizing step S1605 is used in place of the highlighting step S1600.

Figure 10:
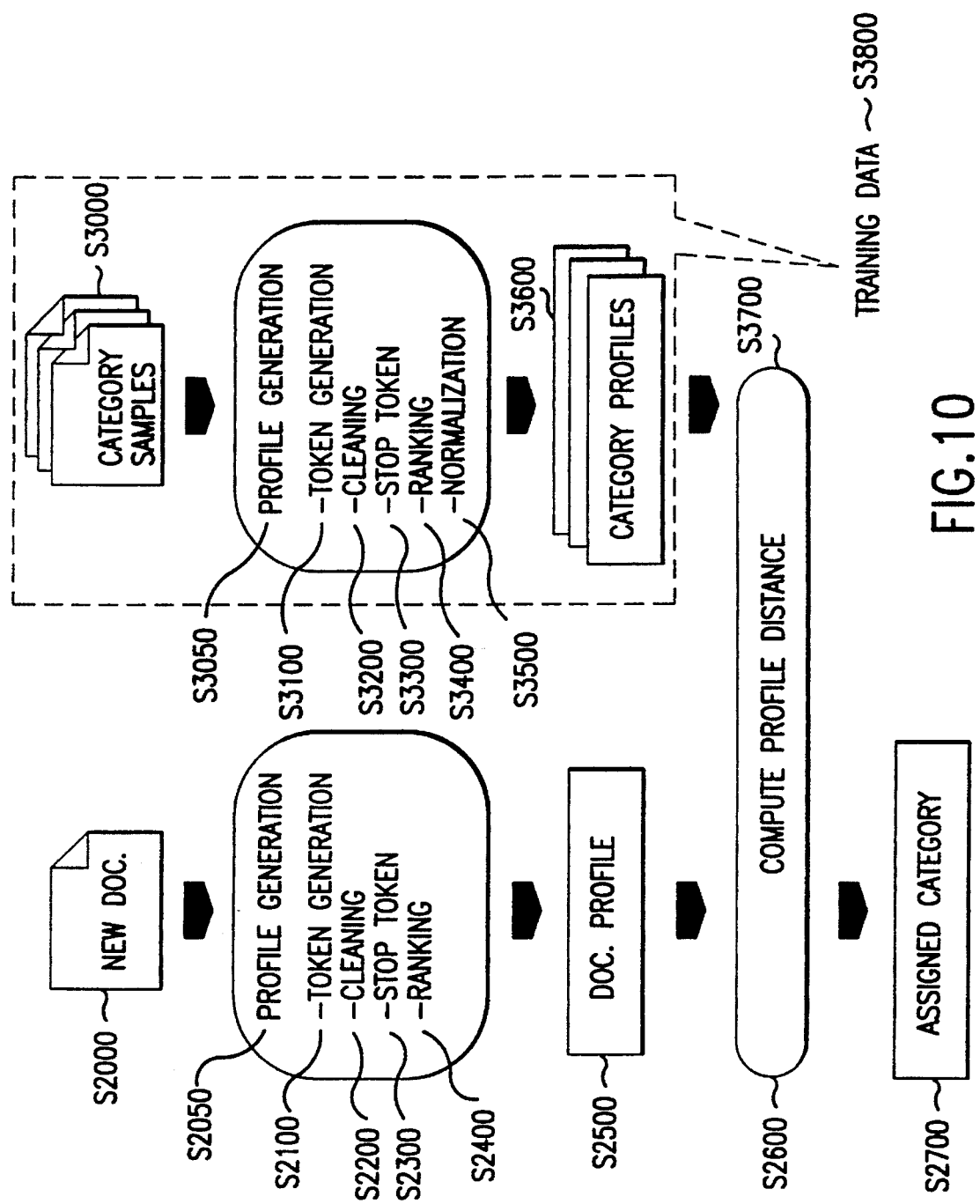
FIG. 10 is a flowchart illustrating another embodiment of the invention.

An overview of such a system and its method of operation is illustrated in FIG. 10.

Shown on the right side of FIG. 10 at step S3000 are reference category documents bounded by their topics; these documents will be used as training or reference data. This reference data will be used to develop reference profiles. At step S3050 the system initiates profile generation, transforming these documents into a token representation at Step S3100. The system then performs a series of processing steps S3200–3400, described before, to rank the frequency of appearance rates of the tokens generated. Following that at step S3500 the system normalizes the reference category rankings by limiting the rankings to a certain number e.g., only rankings 1 to 100 will be used. The resulting reference profiles are representative of the categories of the reference documents.

On the left side FIG. 10 is a new document whose category is to be determined. A profile for the document using steps S2050–2500 is developed. The generated profile ranks all distinct tokens in the document.

At step S2600 the system computes profile "distances." Profile distances are those between the profile of a new document having an unknown category and reference category profiles using "out-of-place measures" introduced by Cavnar and Trenkle (Cavnar and Trenkle, 1994). This "measure" determines how far out of place a token in a new profile is from its place in known profiles i.e., known reference category profiles. For each token in the new document profile, the system finds its counterpart in a known reference category profile and then calculates how far out of place it is. The sum of all of the out of place values becomes the distance measurement of the new document using that category. The system at step 2700 compares distances, and assigns the new document to the "nearest" category.

The categorizing means 265 shown in FIG. 2 may comprise means for determining the token profile of a specific document using the word tokens generated, means for measuring at least one distance between the token profile of a specific document and at least one reference profile and categorizing means for categorizing the specific document based on the at least one distance measured.

The above invention has been described with reference to particular embodiments. Modifications and alterations will occur to others upon reading and understanding this specification. It is intended that all such modifications and alterations are included insofar as they come within the scope of the appended claims or equivalents thereof.

What is claimed is:

1. A method for highlighting and categorizing images from a document using a sequence of word tokens representing words of the document, the word tokens comprising character shape code classes, each word of the document being represented by only one word token, the method comprising the steps of:

eliminating predetermined character shape code classes from said sequence of word tokens;

removing predetermined common function word tokens from said sequence of word tokens to form a reduced sequence of word tokens using a pattern matching technique and a stop token list;

determining word token frequency appearance rates for the word tokens of the reduced sequence;

ranking said frequency of appearance rates;

determining nth or more most frequently appearing word tokens based on the ranked frequency of appearance rates;

highlighting words of the document corresponding to the nth or more most frequently appearing word tokens.

2. The method according to claim 1, further comprising the step of categorizing the document into one of a plurality of pre-existing categories.

3. The method according to claim 2 wherein the categorizing step comprises the steps of:

determining a token profile for said document;

measuring at least one distance between the token profile and at least one reference profile developed from reference data; and categorizing the document into at least one of said pre-existing categories based on the at least one distance measured.

4. The method according to claim 1, wherein said removing step comprises the step of further removing numerical word tokens from said sequence of word tokens using an optional token list.

5. The method according to claim 1, wherein the highlighting step comprises the step of underlining said words of the document corresponding to the nth or more most frequently appearing word tokens.

6. A method for highlighting and categorizing images from a document using a sequence of word tokens representing words of the document, the word tokens comprising character shape code classes, each word of the document being represented by only one word token, the method comprising the steps of:

eliminating predetermined character shape code classes from said sequence of word tokens;

removing predetermined common function word tokens from said sequence of word tokens to form a reduced sequence of word tokens using a pattern matching technique and a stop token list;

determining word token frequency appearance rates for the word tokens of the reduced sequence;

ranking said frequency of appearance rates;

determining nth or more most frequently appearing word tokens based on the ranked frequency of appearance rates;

highlighting words of the document corresponding to the nth or more most frequently appearing word tokens; and categorizing the document into one of a plurality of pre-existing categories.

7. The method according to claim 6 wherein the categorizing step comprises the steps of:

determining a token profile for said document;

measuring at least one distance between the token profile and at least one reference profile developed from reference data; and categorizing the document into at least one of said pre-existing categories based on the at least one distance measured.

8. The method according to claim 6 wherein said removing step comprises the step of further removing numerical word tokens from said sequence of word tokens using an optional token list.

9. The method according to claim 6 wherein the highlighting step comprises the step of underlining said words of the document corresponding to the nth or more most-frequently-appearing word tokens.

10. A method for highlighting and categorizing images from a document using a sequence of word tokens representing words of the document, the word tokens comprising character shape code classes, each word of the document being represented by only one word token, the method comprising the steps of:

eliminating predetermined character shape code classes from said sequence of word tokens;

removing predetermined common function word tokens and numerical word tokens from said sequence of word tokens to form a reduced sequence of word tokens using a pattern matching technique and a stop token list comprising an optional token list;

determining word token frequency appearance rates for the word tokens of the reduced sequence;

ranking said frequency of appearance rates;

determining nth or more most frequently appearing word tokens based on the ranked frequency of appearance rates; and highlighting words of the document corresponding to the nth or more most frequently appearing word tokens.

11. The method according to claim 10, further comprising the step of categorizing the document into one of a plurality of pre-existing categories.

12. The method according to claim 11 wherein the categorizing step comprises the steps of:

determining a token profile for said document;

measuring at least one distance between the token profile and at least one reference profile developed from reference data; and categorizing the document into at least one of said pre-existing categories based on the at least one distance measured.

13. The method according to claim 10, wherein the highlighting step comprises the step of underlining said words of the document corresponding to the nth or more most frequently appearing word tokens.

14. A method for highlighting and characterizing images from a document using a sequence of word tokens representing words of the document, the word tokens comprising character shape code classes, each word of the document being represented by only one word token, the method comprising the steps of:

eliminating predetermined character shape code classes from said sequence of word tokens;

removing predetermined common function word tokens and numerical word tokens from said sequence of word tokens to form a reduced sequence of word tokens using a pattern machine technique and a stop token list comprising an optional token list;

determining word token frequency appearance rates for the word tokens of the reduced sequence;

ranking said frequency of appearance rates;

determining nth or more most frequently appearing word tokens based on the ranked frequency of appearance rates;

highlighting words of the document corresponding to the nth or more most frequently appearing word tokens; and categorizing the document into one of a plurality of pre-existing categories.

15. The method according to claim 14 wherein the categorizing step comprises the steps of:

determining a token profile for said document;

measuring at least one distance between the token profile and at least one reference profile developed from reference data; and categorizing the document into at least one of said pre-existing categories based on the at least one distance measured.

16. The method according to claim 14, wherein the highlighting step comprises the step of underlining said words of the document corresponding to the nth or more most frequently appearing word tokens.

17. A method for highlighting and characterizing images from a document using a sequence of word tokens representing words of the document, the word tokens comprising character shape code classes, each word of the document being represented by only one word token, the method comprising the steps of:

eliminating predetermined character shape code classes from said sequence of word tokens;

removing predetermined common function word tokens from said sequence of word tokens to form a reduced sequence of word tokens using a pattern matching technique and a stop token list;

determining word token frequency appearance rates for the word tokens of the reduced sequence;

ranking said frequency of appearance rates;

determining nth or more most frequently appearing word tokens based on the ranked frequency of appearance rates; and categorizing the document into one of a plurality of pre-existing categories.

18. The method according to claim 17 wherein the categorizing step comprises the steps of:

determining a token profile for said document;

measuring at least one distance between the token profile and at least one reference profile developed from reference data; and categorizing the document into at least one of said pre-existing categories based on the at least one distance measured.

19. The method according to claim 17, further comprising the step of highlighting words of the document corresponding to the nth or more most frequently appearing word tokens.

20. The method according to claim 19, wherein said highlighting step comprises the step of underlining said words of the document corresponding to the nth or more most frequently appearing word tokens.

21. The method according to claim 17, wherein said removing step comprises the step of further removing numerical word tokens from said sequence of word tokens using an optional token list.

22. A method for highlighting and categorizing images from a document using a sequence of word tokens representing words of the document, the word tokens comprising character shape code classes, each word of the document being represented by only one word token, the method comprising the steps of:

eliminating predetermined character shape code classes from said sequence of word tokens;

removing predetermined common function word tokens and numerical word tokens from said sequence of word tokens to form a reduced sequence of word tokens using a pattern matching technique and a stop token list comprising an optional token list;

determining word token frequency appearance rates for the word tokens of the reduced sequence;

ranking said frequency of appearance rates;

determining nth or more most frequently appearing word tokens based on the ranked frequency of appearance rates; and categorizing the document into one of a plurality of pre-existing categories.

23. The method according to claim 22 wherein the categorizing step comprises the steps of:

determining a token profile for said document;

measuring at least one distance between the token profile and at least one reference profile developed from reference data; and categorizing the document into at least one of said pre-existing categories based on the at least one distance measured.

24. The method according to claim 22, further comprising the step of highlighting words of the document corresponding to the nth or more most frequently appearing word tokens.

25. The method according to claim 24, wherein the highlighting steps comprises the step of underlining said words of the document corresponding to the nth or more most frequently appearing word tokens.

26. An apparatus for highlighting and categorizing images from a document using a sequence of word tokens representing words of the document, the word tokens comprising character shape code classes, each word of the document being represented by only one word token, the apparatus comprising:

means for eliminating predetermined character shape code classes from said sequence of word tokens;

means for removing predetermined common function word tokens from said sequence of word tokens to form a reduced sequence of word tokens using a pattern matching technique and a stop token list;

means for determining word token frequency appearance rates for the word tokens of the reduced sequence;

means for ranking said frequency of appearance rates;

means for determining the nth or more most frequently appearing word tokens based on the ranked frequency of appearance rates; and means for highlighting words of the document corresponding to the nth or more most frequently appearing word tokens.

27. The apparatus according to claim 26, further comprising means for categorizing the document into one of a plurality of pre-existing categories.

28. The apparatus according to claim 27, wherein the means for categorizing comprises:

means for determining a token profile for said document;

means for measuring at least one distance between the token profile and at least one reference profile developed from reference data; and means for categorizing the document into at least one of said pre-existing categories based on the at least one distance measured.

29. The apparatus according to claim 26, wherein said means for removing comprises means for further removing numerical word tokens from said sequence of word tokens using an optional token list.

30. The apparatus according to claim 26, wherein said means for highlighting comprises means for underlining said words of the document corresponding to the nth or more most frequently appearing word tokens.

31. An apparatus for highlighting and categorizing images from a document using a sequence of word tokens representing words of the document, the word tokens comprising character shape code classes, each word of the document being represented by only one word token, the apparatus comprising:

means for eliminating predetermined character shape code classes from said sequence of word tokens;

means for removing predetermined common function word tokens from said sequence of word tokens to form a reduced sequence of word tokens using a pattern matching technique and a stop token list;

means for determining word token frequency appearance rates for the word tokens of the reduced sequence;

means for ranking said frequency of appearance rates;

means for determining nth or more most frequently appearing word tokens based on the ranked frequency of appearance rates;

means for highlighting words of the document corresponding to the nth or more most frequently appearing word tokens; and means for categorizing the document into one of a plurality of pre-existing categories.

32. The apparatus according to claim 31 wherein the means for categorizing comprises:

means for determining a token profile for said document;

means for measuring at least one distance between the token profile and at least one reference profile developed from reference data; and means for categorizing the document into at least one of said pre-existing categories based on the at least one distance measured.

33. The apparatus according to claim 31, wherein said means for removing comprises means for further removing numerical word tokens from said sequence of word tokens using an optional token list.

34. The apparatus according to claim 31, wherein said means for highlighting comprises means for underlining said words of the document corresponding to the nth or more most frequently appearing word tokens.

35. An apparatus for highlighting and categorizing images from a document using a sequence of word tokens representing words of the document, the word tokens comprising character shape code classes, each word of the document being represented by only one word token, the apparatus comprising:

means for eliminating predetermined character shape code classes from said sequence of word tokens;

means for removing predetermined common function word tokens and numerical word tokens from said sequence of word tokens to form a reduced sequence of word tokens using a pattern matching technique and a stop token list comprising an optional token list;

means for determining word token frequency appearance rates for the word tokens of the reduced sequence;

means for ranking said frequency of appearance rates;

means for determining the nth or more most frequently appearing word tokens based on the ranked frequency of appearance rates; and means for highlighting words of the document corresponding to the nth or more most frequently appearing word tokens.

36. The apparatus according to claim 35, further comprising means for categorizing the document into one of a plurality of pre-existing categories.

37. The apparatus according to claim 36 wherein the means for categorizing comprises:

means for determining a token profile for said document;

means for measuring at least one distance between the token profile and at least one reference profile developed from reference data; and means for categorizing the document into at least one of said pre-existing categories based on the at least one distance measured.

38. The apparatus according to claim 35, wherein said means for highlighting comprises means for underlining said words of the document corresponding to the nth or more most frequently appearing word tokens.

39. An apparatus for highlighting and categorizing images from a document using a sequence of word tokens representing words of the document, the word tokens comprising character shape code classes, each word of the document being represented by only one word token, the apparatus comprising:

means for eliminating predetermined character shape code classes from said sequence of word tokens;

means for removing predetermined common function word tokens and numerical word tokens from said sequence of word tokens to form a reduced sequence of word tokens using a pattern matching technique and a stop token list comprising an optional token list;

means for determining word token frequency appearance rates for the word tokens of the reduced sequence;

means for ranking said frequency of appearance rates;

means for determining the nth or more most frequently appearing word tokens based on the ranked frequency of appearance rates;

means for highlighting words of the document corresponding to the nth or more most frequently appearing word tokens; and means for categorizing the document into one of a plurality of pre-existing categories.

40. The apparatus according to claim 39 wherein the means for categorizing comprises:

means for determining a token profile for said document;

means for measuring at least one distance between the token profile and at least one reference profile developed from reference data; and means for categorizing the document into at least one of said pre-existing categories based on the at least one distance measured.

41. The apparatus according to claim 39, wherein said means for highlighting comprises means for underlining said words of the document corresponding to the nth or more most frequently appearing word tokens.

42. An apparatus for highlighting and categorizing images from a document using a sequence of word tokens, the word tokens comprising character shape code classes, each word of the document being represented by only one word token, the apparatus comprising:

means for eliminating predetermined character shape code classes from said sequence of word tokens;

means for removing predetermined common function word tokens from said sequence of word tokens to form a reduced sequence of word tokens using a pattern matching technique and a stop token list;

means for determining word token frequency appearance rates for the word tokens of the reduced sequence;

means for ranking said frequency of appearance rates;

means for determining the nth or more most frequently appearing word tokens based on the ranked frequency of appearance rates; and means for categorizing the document into one of a plurality of pre-existing categories.

43. The apparatus according to claim 42 wherein the means for categorizing comprises:

means for determining a token profile for said document;

means for measuring at least one distance between the token profile and at least one reference profile developed from reference data; and means for categorizing the document into at least one of said pre-existing categories based on the at least one distance measured.

44. The apparatus according to claim 42, further comprising means for highlighting words of the document corresponding to the nth or more most frequently appearing word tokens.

45. The apparatus according to claim 44, wherein said means for highlighting comprises means for underlining said words of the document corresponding to the nth or more most frequently appearing word tokens.

46. The apparatus according to claim 42, wherein said means for removing comprises means for further removing numerical word tokens from said sequence of word tokens using an optional token list.

47. An apparatus for highlighting and categorizing images from a document using a sequence of word tokens representing words of the document, the word tokens comprising character shape code classes, each word of the document being represented by only one word token, the apparatus comprising:

means for eliminating predetermined character shape code classes from said sequence of word tokens;

means for removing predetermined common function word tokens and numerical word tokens from said sequence of word tokens to form a reduced sequence of word tokens using a pattern matching technique and a stop token list comprising an optional token list;

means for determining word token frequency appearance rates for the word tokens of the reduced sequence;

means for ranking said frequency of appearance rates;

means for determining the nth or more most frequently appearing word tokens based on the ranked frequency of appearance rates; and means for categorizing the document into one of a plurality of pre-existing categories.

48. The apparatus according to claim 47 wherein the means for categorizing comprises:

means for determining a token profile for said document;

means for measuring at least one distance between the token profile and at least one reference profile developed from reference data; and means for categorizing the document into at least one of said pre-existing categories based on the at least one distance measured.

49. The apparatus according to claim 47, further comprising means for highlighting words of the document corresponding to the nth or more most frequently appearing word tokens.

50. The apparatus according to claim 49, wherein said means for highlighting comprises means for underlining said words of the document corresponding to the nth or more most frequently appearing word tokens.

* * * * *